May 21, 1968 D. L. BEATTY 3,384,720

TELEPHONE ACCESSORY FOR PARTIALLY DISABLED PERSONS

Filed April 1, 1965

INVENTOR.
David L. Beatty
BY John A. Hamilton
Attorney.

United States Patent Office 3,384,720
Patented May 21, 1968

3,384,720
TELEPHONE ACCESSORY FOR PARTIALLY DISABLED PERSONS
David L. Beatty, 10712 E. 84th Terrace, Raytown, Mo. 64138
Filed Apr. 1, 1965, Ser. No. 444,747
6 Claims. (Cl. 179—162)

ABSTRACT OF THE DISCLOSURE

A weight designed to rest in the cradle of an ordinary telephone set, the horizontal displacement of which results in the depressing or releasing of the cradle pushbuttons.

This invention relates to new and useful improvements in telephone accessory equipment, and has as its principal object the provision of a device permitting telephone usage by partially disabled persons as will be described.

Another object is the provision of a device of the character described consisting of a member adapted to rest in the cradle of the base portion of an ordinary telephone instrument in place of the usual handset of the instrument, so as to depress the controlling pushbuttons of the instrument to open the operating circuits of the instrument, said member being shiftable horizontally, without lifting it from the cradle, to release the pushbuttons, or one of them, to close the operating circuits of the instrument to ready it for use.

Still another object is the provision of a device of the character described which is readily adjustable to be adapted for use with telephone instruments of various types, sizes and proportions.

Other objects are extreme simplicity and economy of construction, efficiency and dependability of operation, and adaptability for use without requiring internal adaptation or change in the structure or circuitry of the telephone instrument itself.

Figure 1:
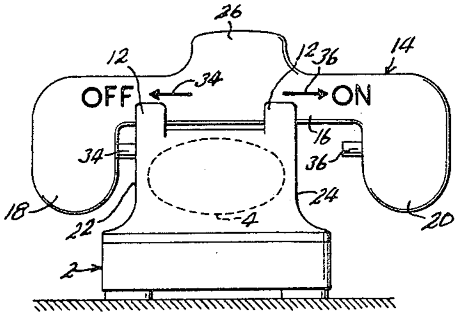
Figure 2:
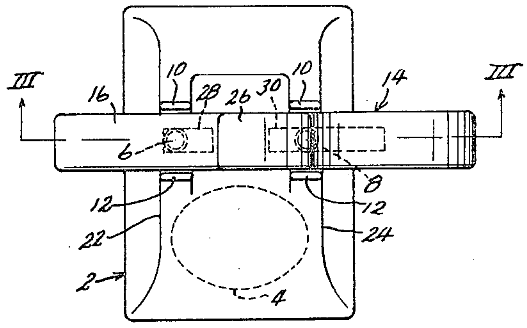
Figure 3:
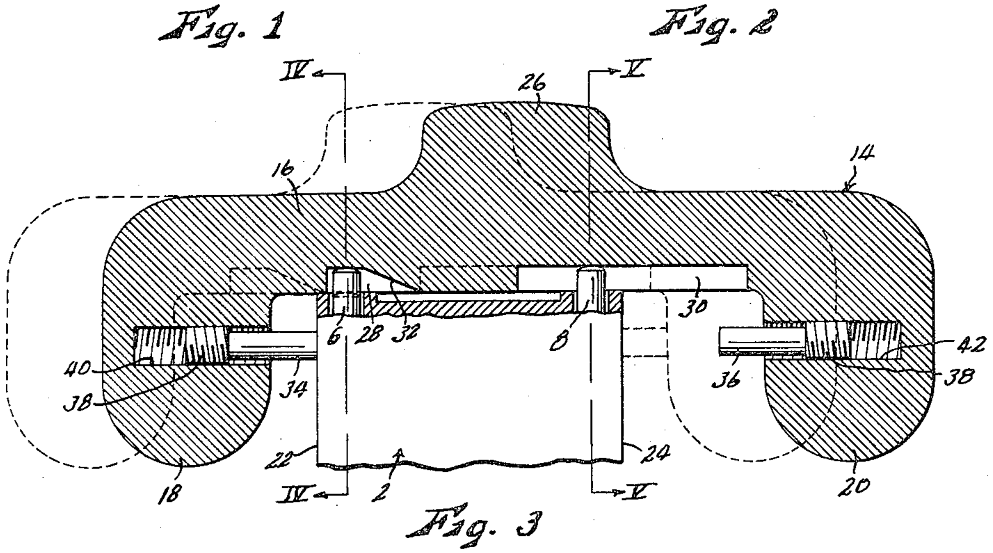
Figure 4:
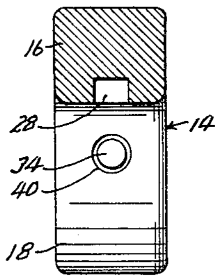
Figure 5:
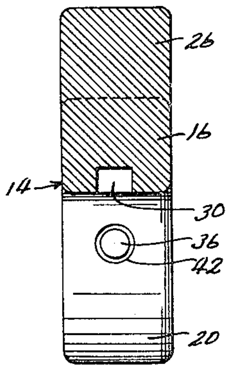

With these objects in view, as well as other objects which will appear in the course of the specification, reference will be had to the accompanying drawing, wherein:

FIG. 1 is a front elevational view of the base portion of an ordinary telephone instrument, with a device embodying the present invention mounted operatively thereon, FIG. 2 is a top plan view of the parts as shown in FIG. 1, FIG. 3 is an enlarged, fragmentary sectional view taken on line III—III of FIG. 2, with parts left in elevation and partially broken away, FIG. 4 is a sectional view of the operating device only, taken on line IV—IV of FIG. 3, and FIG. 5 is a sectional view of the operating device only, taken on line V—V of FIG. 3.

Like reference numerals apply to similar parts throughout the several views, and the numeral 2 applies to the base portion of an ordinary telephone instrument, said base constituting a housing having the usual dial mechanism, indicated schematically by the dotted circle 4, on the forward face thereof, and a pair of spaced apart pushbuttons 6 and 8 normally projecting upwardly from the top portion thereof, said pushbuttons being urged upwardly by resilient means (not shown) within the base. In usual practice, the receiver-transmitter handset (not shown) of the instrument is rested on base 2, so as to depress the pushbuttons, when the instrument is not in use, it being understood that depression of said pushbuttons opens the operating circuits of the instrument to remove it from service. On the other hand, when the handset is removed from the base, the pushbuttons are freed to rise, whereby the operating circuits of the instrument are closed to ready it for use. Base 2 is formed to present a pair of upstanding, spaced apart lugs 10 and 12 immediately adjacent each of the pushbuttons, whereby to define a cradle in which the handle portion of the handset may be rested to insure that the pushbuttons will be depressed thereby. It will be borne in mind that customarily, and almost universally, both of pushbuttons 6 and 8 must be released and allowed to rise to place the phone in service, while only one of said pushbuttons need be depressed to remove the phone from service, or to "hang up."

The operating device forming the subject matter of the present invention is indicated generally by the numeral 14, and comprises a bar 16, normally disposed horizontally, having integral depending abutment members 18 and 20 respectively at opposite ends thereof. Said device is of uniform horizontal thickness throughout, and may conveniently be formed from a wooden board of the proper thickness, although it obviously may also be formed of plastic, metal, or other suitable material. In use, bar 16 rests horizontally on base 2 in alignment with pushbuttons 6 and 8, and between lugs 10 and 12, which insure that said bar must overlie said pushbuttons. In this position, abutment members 18 and 20 are disposed respectively adjacent but in spaced apart relation from side walls 22 and 24 of instrument base 2, whereby bar 16 may be slidably moved on the base in a direction parallel to its axis. Bar 16 is provided intermediate its ends with an upstanding lug 26 which serves as a handle whereby the bar may be moved.

Bar 16 has two longitudinally spaced apart and longitudinally extending grooves 28 and 30 formed in the lower surface thereof for receiving pushbuttons 6 and 8 respectively therein. As shown, pushbutton 6 is engaged in groove 28, said groove being sufficiently deep at one end to allow the pushbutton to rise sufficiently to cause it to ready the phone for service, but having its opposite end portion gradually reduced to zero depth, as indicated by bevel 32. Pushbutton 8 is engaged in groove 30, which is of such depth throughout its length to allow the pushbutton to rise sufficiently to place the telephone in service.

Thus, if the operating device 14 is moved to the right, as illustrated in FIG. 3 in solid lines, so that pushbutton 6 rises into the deep portion of groove 28, both of the pushbuttons are elevated and the phone is ready for service. On the other hand, if the device is moved to the left as shown in dotted lines, the bevelled portion 32 of groove 28 cams pushbutton 6 downwardly to its depressed position, thereby removing the phone from service on "hanging up." In this connection, it will of course be apparent that the operating device must have sufficient weight to depress the pushbuttons even when resting on the instrument base only by gravity. Suitable indicia may be imprinted on the device, as shown at 34 and 36 in FIG. 1, to indicate to the user the direction the device should be moved. Both of the grooves 28 and 30 could be bevelled in the same manner as groove 28, so as to depress both of the pushbuttons, but this is not necessary since as previously discussed the depression of a single pushbutton is sufficient to "hang up" the phone. Moreover, making groove 30 of uniform depth so as to operate only the pushbutton 6 while leaving pushbutton 8 extended at all times, has the advantage of rendering the device independent of the spacing between the pushbuttons. This spacing varies somewhat in phones of various styles and types.

It will be readily apparent that my operating device may very easily and conveniently be shifted from one position to the other by a simple nudging motion against handle 26, or against the ends of the device, by many partially disabled persons who nevertheless do not possess sufficient muscular strength, control or coordination to lift and hold the handset in the customary manner. When the present device is in use, it will be understood that the telephone handset is preferably permanently mounted in a suitable stand or holder so as to be positioned for use by the disabled person, although such stand or holder is not directly pertinent to the present invention and is not shown. Once the member has been moved to its "On" position as shown in solid lines in FIG. 3, the user need only dial "Operator," which also is an operation many partially disabled persons can perform even though they could not effectively dial the seven digits in the usual phone number, and then give the number to the operator orally. Telephone companies willingly render this service to disabled persons if the circumstances are explained.

While in an operating device as described for a single type and style of telephone the abutment members 18 and 20 could be proportioned and positioned to engage side walls 22 and 24 of the instrument base directly, it has also been found that various different styles and types of telephone instruments vary somewhat in dimensions. Not only do they vary as to the spacing between pushbuttons 6 and 8, as already discussed, but also as to the spacing between side walls 22 and 24, and as to the spacing between the pushbuttons and the side walls. To compensate for these variations, whereby to render the device substantially universally adaptable to various instruments, the present device includes a pair of stop pins 34 and 36 disposed coaxially with each other, and parallel to and below bar 16, the outer end portions 38 of said stop pins being threaded for engagement in internally threaded bores 40 and 42 formed respectively in abument members 18 and 20. The contiguous ends of said stop pins project inwardly from said abutment members for engagement respectively with instrument base walls 22 and 24. To adjust said stop pins to any particular instrument, bar 16 is first positioned so that pushbutton 6 is engaged in the deepest portion of groove 28, and stop pin 34 is advanced inwardly until its inner end engages base side wall 22. Preferably, pin 34 is advanced so that the deepest end wall of groove 28 can never strike the pushbutton. This avoids lateral blows to the pushbutton in use, which might otherwise damage the instrument. Then bar 16 is moved to the left until pushbutton 6 is fully depressed by engagement with the portion of the bar between the two grooves, and pin 36 is advanced inwardly until its inner end engages base wall 24. The device is then fully adjusted to that particular telephone instrument, and is ready for use.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. An operating device for a telephone instrument including a base having at least one pushbutton normally extending upwardly from said base to ready said instrument for service but being downwardly yieldable by pressure exerted thereon to remove said instrument from service, said operating device comprising:

(a) a member of sufficient weight to depress said pushbutton and adapted to rest on said base in overlying relation to said pushbutton, and to be moved slidably on said base in a horizontal direction, said member having a recess formed in the lower surface thereof adapted to receive said pushbutton therein to permit upward extension thereof when said member is in one position of its horizontal movement, said recess being taperingly reduced in depth in a direction parallel to the horizontal movement of said member, whereby said pushbutton is depressed by engagement thereof in a shallower portion of said recess when said member is moved horizontally on said base to another position.

2. A telephone operating device as recited in claim 1 for use in connection with a telephone instrument base having a pair of said pushbuttons disposed in horizontally spaced apart relation, and wherein said member has a pair of said recesses formed therein in aligned relation and receiving said pushbuttons respectively therein.

3. A telephone operating device as recited in claim 1 for use in connection with a telephone instrument base having a pair of said pushbuttons disposed in horizontally spaced apart relation, said instrument being such that both of said pushbuttons must be extended upwardly to ready the instrument for service, but is removed from service by depression of either of said pushbuttons, said member having a pair of recesses formed in the lower surface thereof and engaged respectively by said pushbuttons, one of said recesses being of uniform depth so as to permit upward extension of the associated pushbutton at all positions in the horizontal movement of said member.

4. A telephone operating device as recited in claim 1 wherein said member constitutes a bar extending parallel to its direction of horizontal movement on said instrument base, and said instrument base has a pair of opposite side walls depending from the level of said pushbutton, said bar having an abutment member depending from each end thereof and cooperating with said base side walls to limit horizontal movement of said bar.

5. A telephone operating device as recited in claim 1 wherein said member constitutes a bar extending parallel to its direction of horizontal movement on said instrument base, and said instrument base has a pair of opposite side walls depending from the level of said pushbutton, said bar having an abutment member depending from each end thereof and cooperating with said base side walls to limit horizontal movement of said bar, and with the addition of:

(a) a pair of stop members movably mounted respectively in said abutment members and projecting inwardly therefrom in opposed relation for engagement with said base side walls, said stop members being adjustable in said abutment members whereby to vary the spacing between the contiguous extremities of said stop members.

6. An operating device for a telephone instrument including a base having a pair of pushbuttons normally extending upwardly therefrom in horizontally spaced apart relation to ready said instrument for service but being downwardly yieldable by pressure exerted thereon to remove said instrument for service, said instrument being such that both of said pushbuttons must be extended to ready said instrument for service but being removed from service by depression of either of said pushbuttons, and said instrument base including a pair of opposed, generally vertical side walls depending from the level of said pushbuttons and disposed generally at right angles to a vertical plane including said pushbuttons, said operating device comprising:

(a) a bar of sufficient weight to depress said pushbuttons and adapted to rest horizontally on said base in overlying relation to said pushbuttons, said bar extending parallel to a horizontal line interconnecting said pushbuttons and being longitudinally slidable on said base, said bar having a pair of spaced apart, longitudinally extending grooves formed in the lower surface thereof to be engaged respectively by said pushbuttons, one of said grooves having an end portion thereof of sufficient depth to allow extension of the associated pushbutton and being taperingly reduced in depth toward its opposite end, and the other of said grooves being of sufficient depth throughout its length to permit extension of the associated pushbutton at all times, (b) a pair of abutment members affixed to and depending respectively from the opposite ends of said bar so as to be disposed in spaced apart relation from the respective side walls of said instrument base, and (c) a pair of stop members adjustably affixed respectively in said abutment members and extending inwardly therefrom, whereby to limit longitudinal movement of said bar by engagement with said base side walls, said stop members being adjustable in said abutment members whereby to vary the spacing between the contiguous extremities of said stop members.

No references cited.

KATHLEEN H. CLAFFY, *Primary Examiner.*

D. L. STEWART, *Assistant Examiner.*